US006394309B1

(12) United States Patent
Fainberg

(10) Patent No.: US 6,394,309 B1
(45) Date of Patent: May 28, 2002

(54) AUTOMATIC VENDING MACHINE FOR DISPENSING PRODUCTS IN A HANGABLE PAPER OR PLASTIC BAGS

(75) Inventor: Abram Fainberg, 7 Roger Williams Green, Providence, RI (US) 02904

(73) Assignee: Abram Fainberg, Providence, RI (US)

( * ) Notice: Subject to any disclaimer, the term of this patent is extended or adjusted under 35 U.S.C. 154(b) by 0 days.

(21) Appl. No.: 09/928,709

(22) Filed: Aug. 13, 2001

(51) Int. Cl.[7] .................... B65G 59/00
(52) U.S. Cl. .................... 221/278; 206/554
(58) Field of Search .................... 221/33, 44, 1, 221/278; 206/554, 806; 219/679

(56) References Cited

U.S. PATENT DOCUMENTS

| | | | | |
|---|---|---|---|---|
| 5,205,435 A | * | 4/1993 | Daniels | 221/44 |
| 5,295,940 A | | 3/1994 | Fainberg | 493/88 |
| RE35,207 E | | 4/1996 | Daniels | 221/44 |
| 5,657,684 A | | 8/1997 | Chaikowsky | 99/323 |
| 6,112,539 A | | 9/2000 | Colberg | 62/331 |
| 6,137,098 A | | 10/2000 | Moseley | 219/679 |
| 6,149,565 A | | 11/2000 | Meyer | 493/22 |
| 6,200,300 B1 | | 3/2001 | Petriekis | 604/408 |
| 6,204,491 B1 | | 3/2001 | Montany | 219/679 |

* cited by examiner

*Primary Examiner*—Kenneth W. Noland

(57) ABSTRACT

An automatic vending machine for dispensing products, particularly popcorn and ice, in hangable paper or plastic bags and method to operate the same is disclosed. The standard paper or plastic bags having sealed bottom side and open topside are improved in so that they can be hanged and opened for filling with products. In the machine these bags are hanging in a few rows to provide vending product in several pack sizes. The hanged bags are slide in a queue manner to the loading area where the next one is straightened, filled with product, sealed, withdraw from the rack and later moved to the consumer access area by gravity. The user merely deposits a specified amount of money into the slot of the machine and thereafter receives the completely sealed bag with product.

19 Claims, 3 Drawing Sheets

AUTOMATIC VENDING MACHINE FOR DISPENSING PRODUCTS IN A HANGABLE PAPER OR PLASTIC BAGS

BACKGROUND OF THE INVENTION

1. Field of the Invention

This invention relates generally to automatic vending machines, and more particularly to an apparatus and method for vending food products including popcorn and ice in a hangable paper or plastic bags that can be sealed to provide quality of the products.

2. Description of the Prior Art

For many years, paper and plastic bags have been widely used in supermarkets and stores for a number of purposes due to their low cost, lightweight, and relatively strength. However, present bags, of all sizes and configurations are provided only for hand operation purposes and can't be used in automatic vending machines. Some attempts to use present bags in automatic vending machines haven't a practical application. For example, U.S. Pat. No. 6,112,539 discloses a device for making, bagging, and delivering a sealed bag of ice to a consumer. The machine has a replaceable roll of plastic material which is conveyed through it and also, cutting and heat-sealing means for producing completely sealed bags of ice. As described in this patent the upper edge of the bag, while the bag is filling with ice, is being held by negative pressure of a vacuum tube means. It's simple but not simple enough for stability of the machine running and is unreliable. U.S. Pat. Nos. 6,137,098 and 6,204,491 are describe a microwave popcorn bag technology adapted to contain a plurality of popcorn kernels with a predetermined amount of oil and spice to be heated and popped within the interior of the bag (by microwave energy). These technologies for automatically producing sealed bags with popcorn have some disadvantages:

a) The machine can produce only small packs of popcorn;

b) The process of cooking is complicated: at first time the corn seeds must be sealed in packs and only then these packs can be cooked.

To the description of the Prior Art related also U.S. Pat. No. 5,295,940 that describes a novel construction whereby pail boxes can be automatically made inside of a vending machine for packing with goods. However, this patent, for whatever reasons, has not found practical use.

Consequently, these deficiencies in sum create need for a novel construction of bags that can be used in automatic vending machines for packing and sealing widely assorted products.

SUMMARY OF THE INVENTION

Generally stated, the object of the invention is to provide an automatic vending technology for vending products, particularly popcorn and ice, whereby consumer can purchase product in sealed paper or plastic bags of multiple sizes by depositing a special amount of money into the slot of the machine.

Another object of the invention is to provide improved hangable paper and plastic bags capable for use in automatic vending machines for vending products in sealing packages.

In accordance with the present invention the automatic vending machine comprises: a housing for holding the components of the machine, an industrial apparatus with dispenser adapted to produce and dispense product of definite quality to the predetermined place, a rack means for hanging and delivering next bag to the loading area of said dispenser, a vacuum means for opening the top edge of the bag and also for withdrawing the completely sealed bag with product from said rack, a retaining means for retaining the rear wall of the bag while the vacuum means will gripped the front wall to provide an opening of the bag, and hangable paper or plastic bags suited for use with this automatic vending technology. In order that the invention and objects thereof may be readily understood and put into practice, reference will now be made to the various figures of the following drawings.

DESCRIPTION OF THE PREFERRED EMBODIMENT

Figure 1:
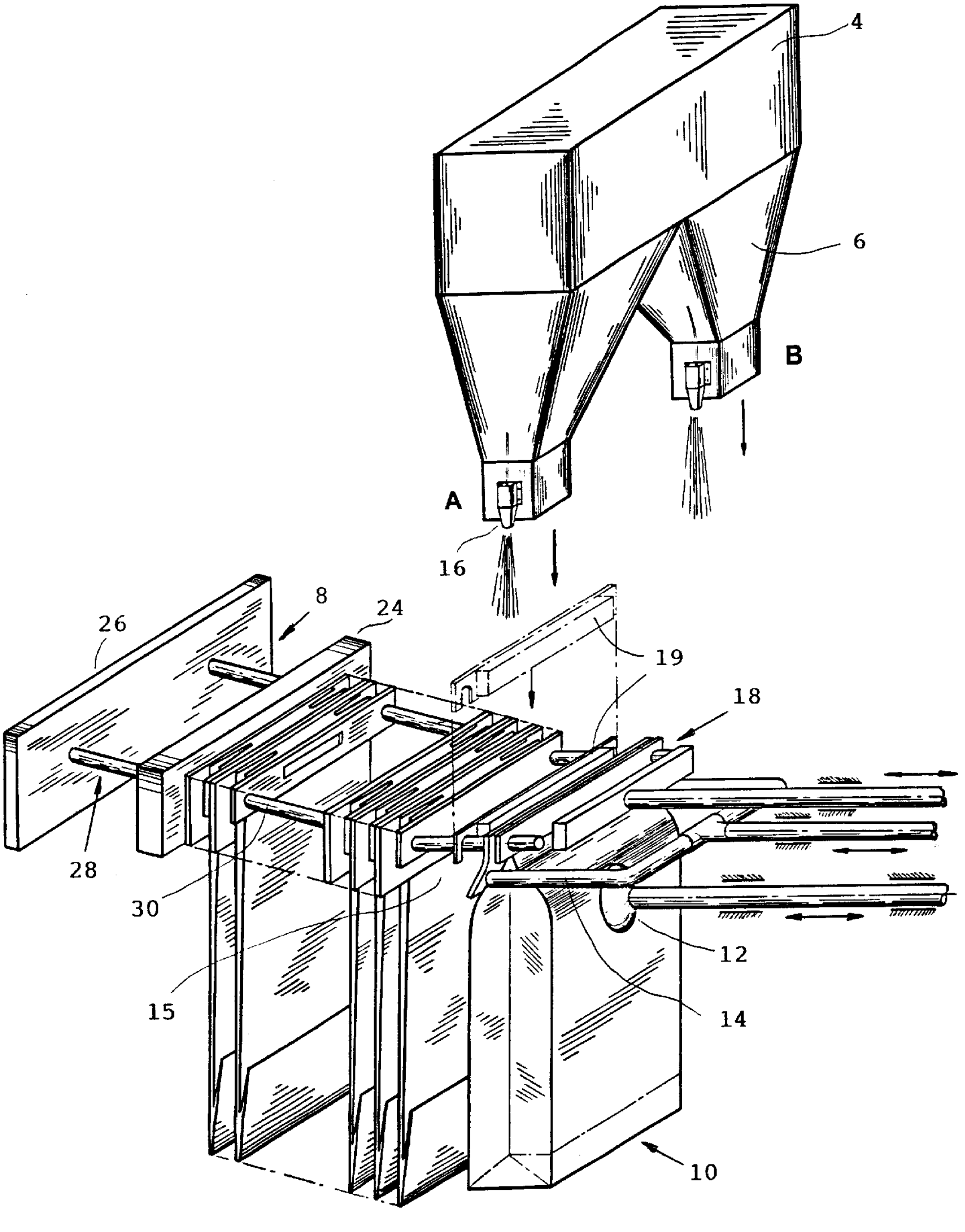
FIG. 1 is a perspective view of this present automatic vending machine without outer casing, showing one production line for dispensing products in gussets paper bags.

While this invention is susceptible of embodiments in many different forms, there is shown in the drawings and will herein be described in detail a preferred embodiment for vending popcorn and ice. It should be understood that the automatic vending machine is equipped with housing for holding the components of the machine, and having an industrial food producing device (for vending popcorn it will be popcorn popper, for vending ice it will be ice-making machine, etc.), with dispenser for delivering a definite quantity of product to the predetermined place of the machine, some electro-motors, chutes and so on. All of this equipment are well known in the art and therefore not described in detail in this specification. Referring now to FIGS. 1–12 and initially to FIG. 1 there is shown a preferred embodiment of an automatic vending machine without concretization of the vendible product. As can be seen the machine comprises a source 4 with dispenser 6 for producing and dispensing the vendible product, a rack means 8 for hanging empty bags and delivering next one to the loading area, a vacuum means 12 for opening the top edge of the bag to be filled with product and also for withdrawing the completely sealed bag with product from said rack, a retaining means 14 for retaining the rear wall of said bag while said vacuum means opens the top edge of said bag and also for gripping said bag and drawing it to provide a space 15 between filled up bag and empty bags, a straightening means 16 for straightening said bag by inflating air, a sealing means 18 and 19 for sealing filled up bag with product, and a bag means 10 to facilitate packing the vended product.

Figure 2:
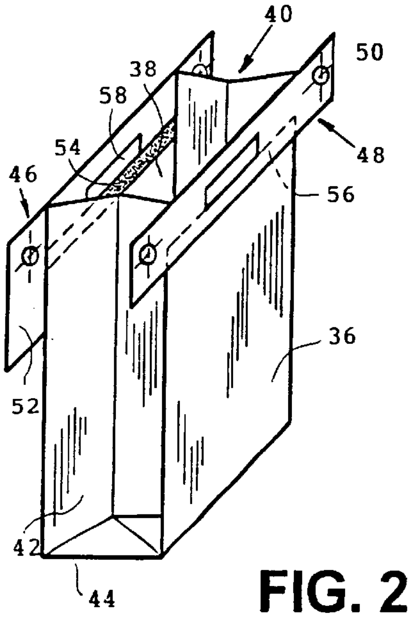
FIG. 2 is a perspective view showing a hangable bag with gussets sides and attached reinforcing strips where the top edges of the bag and strips are matched.
Figure 3:
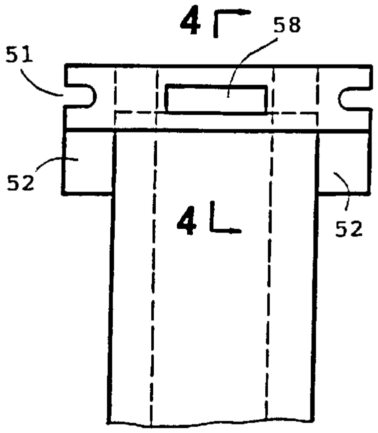
FIG. 3 is a front view of the bag of FIG. 2 where instead the hanging holes are shown slots.
Figure 4:
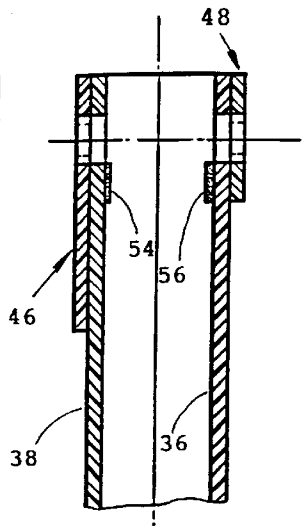
FIG. 4 is a cross-sectional view taken along line 4—4 of FIG. 3.
Figure 5:
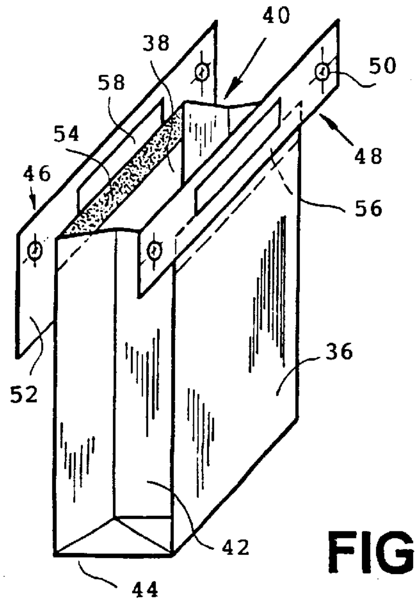
FIG. 5 is a perspective view of a hangable bag like in FIG. 2 except that the top edge of the bag is lower than the apertures of the reinforcing strips.
Figure 6:
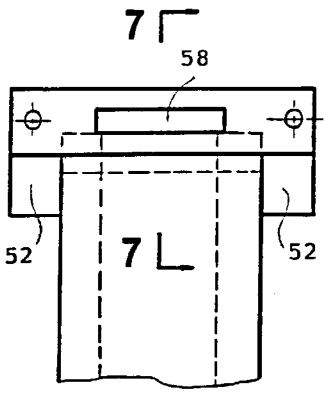
FIG. 6 is a front view of the bag of FIG. 5.
Figure 7:
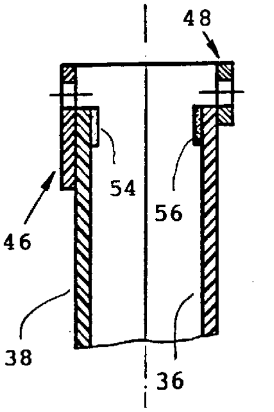
FIG. 7 is a cross-sectional view taken along line 7—7 of FIG. 6.
Figure 8:
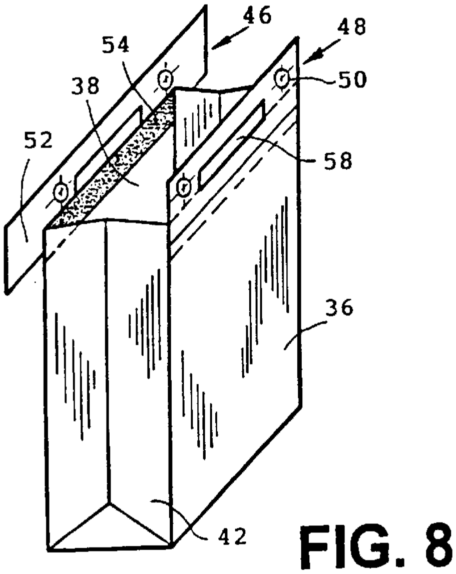
FIG. 8 is a perspective view of a hangable bag like in FIG. 5 except that the reinforces strips has same width but different length.
Figure 9:
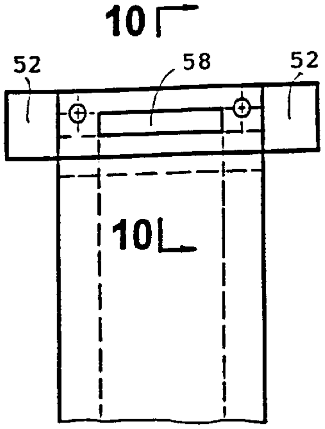
FIG. 9 is a front view of the bag of FIG. 8.
Figure 10:
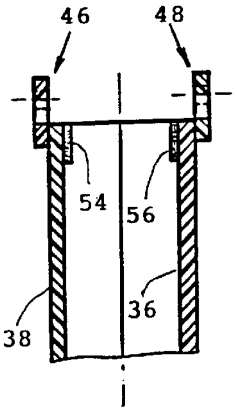
FIG. 10 is a cross-sectional view taken along line 10—10 of FIG. 9.
Figure 11:
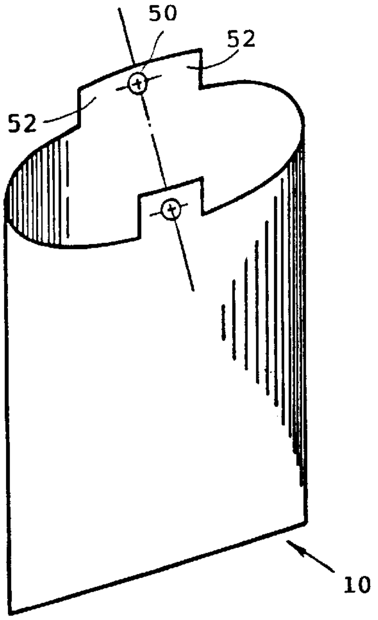
FIG. 11 is a perspective view of a bag without reinforcing strips made from heavy-duty material with two holes for hanging on one hanger.
Figure 12:
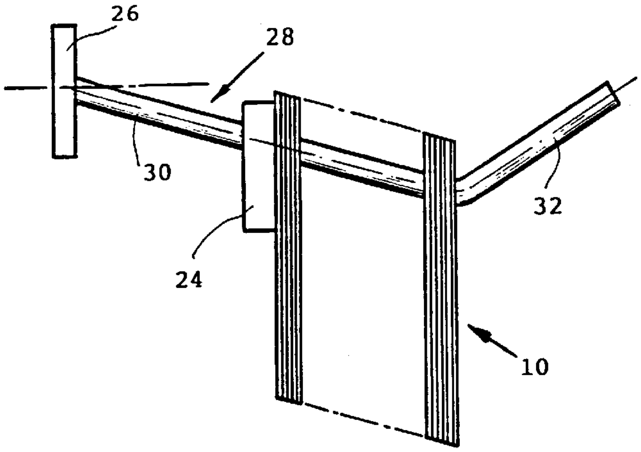
FIG. 12 is a side view of a rack with bags and pusher.

The drawing FIG. 1 illustrates the apparatus with two outlets A and B, for two independent lines for filling up bags of two different sizes. This arrangement is illustrated by mere way of example, since the apparatus could be provided with a single line, as well as with more than two independent lines and with bags made from paper or plastic. The following description will thus refer to an apparatus comprising a single line (hereinafter simply called line). As shown in FIG. 12 the rack means 8, that is to be mounted to the housing of the machine, comprises a pusher 24, a transverse plate 26 and a number of hangers 28 (generally two for each line). Each hanger is represent as a bended in vertical plane bar the long part of which 30 is secured to the transverse plate 26 horizontally or inclining down whereas the short part 32 is directed upwardly. On the long parts 30 are hanged a number of bags 10 for packing the vended product. The incline of the short part 32 upwardly prevent the bags to sliding spontaneously. FIGS. 2–4 illustrated a preferred embodiment of a paper or plastic bag having front wall 36, rear wall 38, two gusseted sides 42, sealed bottom 44 at one end and an open top 40 opposite thereto. To the front and rear walls at its top edges are adhesively secured reinforcing strips 46 and 48, having punched holes 50 or slots 51 for hanging on the rack 8. The strip 46 is wider than the strip 48 to provide places 52 for retaining the rear wall 38 during opening the bag and filling it with product. Strips of adhesive 54 and 56 such as heat actuated adhesive are applied on inside surfaces of the front 36 and rear 38 walls of the paper bags for heat sealing the filled up bags. There is provided also an aperture 58 for handling the completely sealed bag. In FIGS. 5–11 are shown some different bags than in FIGS. 2–4. Thus in FIGS. 5–7 the apertures of the strips 46 and 48 are above the top edge of the bag, in FIGS. 8–10 the strips have same width but different length, and in FIG. 11 the bag is made from a heavy-duty material without gusseted sides and for hanging on a rack with one hanger 28. All bags illustrated in FIGS. 2–11 are provided with punched holes 50 or slots 51 and retaining places 52. As mentioned above the automatic vending machine can be configured to have multiple lines, say three, to provide vending product in completely sealed bags of different weights. The automatic machine is intended to be driven in timed or synchronized relationship which may be achieved by means of any conventional and synchronizing mechanisms well known in the art. For example, the drive mechanism can be operated by a program control unit, which has a number of adjustable discs. These cam discs are mounted on a shaft one rotation of which corresponds to one cycle of the machine to produce and deliver one filled up bag with product to the consumer access area. To do so, the user merely deposits a specific amount of money into the coin depositing slot to start rotation the shaft with cam discs which operate successive actuators to provide the following operation:

Gripping the front wall 36 of the bag 10 by vacuum lifter means 12 to provide the opening of the top edge 40 of the bag;

Straitening bag 10 by inflation air provided by device 16;

Filling up the bag with product by energizing dispenser 6;

Drawing filled up bag with product to provide space 15 for placing removable heating element 19 of the sealing means 18;

Heat sealing filled up bag by sealing means 18;

Withdrawing the completely sealed bag with product from the rack 8 by vacuum lifter means 12 and retaining means 14 to allow it dropping by gravity along the chute (not shown) to the customer access area.

Maintenance of the automatic vending machine is provided by an authorized person who once in a while will charge the machine with hanging bags strung on the hangers 28.

Although particular embodiments of the present invention have been illustrated and described, it will be apparent to those skilled in the art that various changes and modifications can be made without departing from the spirit of the present invention, and it is intended to cover in the appended claims all such changes and modifications that fall within the scope of the present invention.

I claim:

1. An automatic vending machine for dispensing, packing, and sealing popcorn in a hangable paper or plastic bags 10 comprising:

a housing for holding the components of the vending machine;

an industrial popcorn popper 4 with dispenser 6 which adapted to produce and dispense popcorn of definite quality to the predetermined place;

a rack means 8 for hanging and delivering next bag to the loading area of said dispenser, said rack means comprising generally two hangers 28 each represented as a bar secured by one end horizontally or inclined down, and a pusher means 24 which slides by gravity or other source along said hangs to move said bags to said loading area;

a vacuum means 12 for opening the top edge 40 of said bag and also for withdrawing the completely sealed bag with popcorn from said rack to allow it later to move to the consumer access area by gravity;

a retaining means 14 for retaining the rear wall 38 of said bag while said vacuum means is gripped the front wall 36 to provide an opening of said bag;

a bag means 10 for packing vended popcorn in hanging position, said bag means comprises at least a front wall, a rear wall, a sealed bottom, and an open top wherein said front and rear walls has punched holes or slots for hanging on said rack, said rear wall has a retaining place or places 52 for drawing said walls one from another by vacuum means to open said bag.

2. The automatic vending machine of claim 1, wherein said rack means comprises at least one hanger 28 on which are hanged said bags.

3. The automatic vending machine of claim 2 wherein said hanger is bended in vertically plane so that its long part is secured horizontally or inclining down whereas the short part 32 is directed upwardly.

4. The automatic vending machine of claim 1, wherein to the top edges of said front and rear walls are secured reinforcing strips having punched holes or slots for hanging said bag, said strip secured to said rear wall has retaining place or places 52 for drawing said walls one from another by said vacuum means to provide an opening said bag.

5. The automatic vending machine of claim 1, wherein the equipment of the apparatus has two or more production lines to provide vending popcorn in bags of different weights.

6. The automatic vending machine of claim 1, further comprises a bag straightening means 16 for straightening said bag by inflating air.

7. The automatic vending machine of claim 1, further comprises a heat sealing means 18 for sealing the filled up bag with popcorn.

8. The automatic vending machine of claim 1, wherein said bag means have an aperture 58 for handling said bag with popcorn.

9. Method for automatically dispensing, packing, and sealing product in hangable bags to be dispensed to the public, using an automatic vending machine according to claim 1, comprising at least the steps of:

Hanging said rack 8 with empty hangable bags 10 which are moved by gravity or other source in queue manner to the loading area;

Opening the top edge of the next said bag by vacuum means 12;

Filling up said bag with product that is provided by dispenser 6;

Withdrawing said filled up bag with product from said rack by vacuum means 12.

10. Method according to claim 9, further comprising step of heat sealing bag with product by using heat sealing means 18.

11. Method according to claim 9, further comprising step of dispensing product in two or more outlets.

12. An automatic vending machine for dispensing, packing, and sealing ice in a hangable plastic bag 10 comprising:

a housing for holding the components of the vending machine;

an industrial ice-making machine 4 with dispenser 6 which adapted to produce and dispense ice of definite quality to the predetermined place;

a rack means 8 for hanging and delivering next bag to the loading area of said dispenser, said rack means comprising generally two hangers 28 each represented as a bar secured by one end horizontally or inclined down, and a pusher means 24 which slides by gravity or other source along said hangs to move said bags to said loading area;

a vacuum means 12 for opening the top edge 40 of said bag and also for withdrawing the completely sealed bag with ice from said rack means to allow it later to move to the consumer access area by gravity;

a retaining means 14 for retaining the rear wall 38 of said bag while said vacuum means is gripped the front wall 36 to provide an opening of said bag;

a bag means 10 for packing vended ice in hanging position, said bag means comprises at least a front wall, a rear wall, a sealed bottom, and an open top wherein said front and rear walls has punched holes or slots for hanging on said rack, said rear wall has a retaining place or places 52 for drawing said walls one from another by vacuum means to open said bag.

13. The automatic vending machine of claim 12, wherein said rack means comprises at least one hanger 28 on which are hanged said bags.

14. The automatic vending machine of claim 13, wherein said hanger is bended in vertically plane so that its long part is secured horizontally or inclining down whereas the short part 32 is directed upwardly.

15. The automatic vending machine of claim 12, wherein to the top edges of said front and rear walls are secured reinforcing strips having punched holes or slots for hanging said bag, said strip secured to said rear wall has retaining place or places 52 for drawing said walls one from another by said vacuum means to provide an opening said bag.

16. The automatic vending machine of claim 12, wherein the equipment of the apparatus has two or more production lines to provide vending ice in bags of different weights.

17. The automatic vending machine of claim 12, further comprising a bag straightening means 16 for straightening said bag by inflating air.

18. The automatic vending machine of claim 12, further comprises a heat sealing means 18 for sealing the filled up bag with ice.

19. The automatic vending machine of claim 12, wherein said bag means have an aperture 58 for handling said bag with ice.

* * * * *